US011478946B2

(12) United States Patent
Zunino

(10) Patent No.: US 11,478,946 B2
(45) Date of Patent: Oct. 25, 2022

(54) TIRE DISRUPTOR DEVICE

(71) Applicant: PNEUS JET RECYCLING S.R.L., Verona (IT)

(72) Inventor: Domenico Zunino, Verona (IT)

(73) Assignee: PNEUS JET RECYCLING S.R.L., Verona (IT)

( * ) Notice: Subject to any disclaimer, the term of this patent is extended or adjusted under 35 U.S.C. 154(b) by 491 days.

(21) Appl. No.: 16/486,101

(22) PCT Filed: Jan. 31, 2018

(86) PCT No.: PCT/IT2018/000013
§ 371 (c)(1),
(2) Date: Aug. 14, 2019

(87) PCT Pub. No.: WO2018/150444
PCT Pub. Date: Aug. 23, 2018

(65) Prior Publication Data
US 2020/0189140 A1 Jun. 18, 2020

(30) Foreign Application Priority Data

Feb. 14, 2017 (IT) .......................... 102017000001260
Feb. 16, 2017 (IT) .......................... 102017000017212

(51) Int. Cl.
*B02C 18/00* (2006.01)
*B26D 3/00* (2006.01)
(Continued)

(52) U.S. Cl.
CPC .............. *B26D 3/005* (2013.01); *B02C 18/00* (2013.01); *B02C 19/06* (2013.01); *B02C 19/061* (2013.01);
(Continued)

(58) Field of Classification Search
CPC ....... B02C 19/06; B02C 19/061; B29B 17/02; B29B 17/0412; B29B 2017/0428; B29B 2017/002
See application file for complete search history.

(56) References Cited

U.S. PATENT DOCUMENTS 4,813,614 A * 3/1989 Moore ................ B29B 17/0408
241/3
5,115,983 A * 5/1992 Rutherford, Sr. ....... B02C 19/06
241/DIG. 31
(Continued)

FOREIGN PATENT DOCUMENTS

DE 19648551 5/1998
DE 19818566 10/1999
(Continued)

*Primary Examiner* — Faye Francis
(74) *Attorney, Agent, or Firm* — Workman Nydegger

(57) ABSTRACT

Disruptor device consisting in a frame said frame (F) having a Water Jet system to disaggregate one portion a tread or a sidewall of a tire, an hydraulic power unit, a control cabinet with PLC and control panel, a lower assembly, an upper assembly, an hopper for collection of fragmented materials and a vibrating screen, a group for the forced ventilation system and the air/water separation wherein the upper assembly consists on a frame divided in two identical first half-frame and second half-frame (20b); the upper assembly is supported to the frame (F) by two arms (1a, 1b); the upper assembly (9) presents a series of rollers (14) and a movable plate (24) positioned on each half-frame (20a, 20b) between two of these rollers (14) and supporting an upper nozzles head (18) supplied by high pressure water through a piping system; the lower assembly (2) presents a set of rollers (15) mounted on a fixed frame (22); in the space between two of rollers (15) scrolls a slide (24) for nozzle-head (21) that supports one or more, left and right, lower nozzles (23) supplied by high pressure water through a piping system.

18 Claims, 12 Drawing Sheets

(51) Int. Cl.
*B26F 3/00* (2006.01)
*B29B 17/02* (2006.01)
*B29B 17/04* (2006.01)
*B02C 19/06* (2006.01)
*B26D 7/00* (2006.01)

(52) U.S. Cl.
CPC .............. *B26F 3/004* (2013.01); *B29B 17/02* (2013.01); *B29B 17/0412* (2013.01); *B26D 2007/0018* (2013.01); *B29B 2017/0224* (2013.01); *B29B 2017/0428* (2013.01)

(56) References Cited

U.S. PATENT DOCUMENTS

| | | | | |
|---|---|---|---|---|
| 5,299,748 A | * | 4/1994 | Brewer | B02C 19/186 157/16 |
| 5,482,215 A | * | 1/1996 | Veres | B26D 3/005 241/3 |
| 5,577,672 A | * | 11/1996 | Holmes | B26D 7/0625 241/DIG. 38 |
| 5,590,838 A | * | 1/1997 | Brewer | B02C 18/182 241/DIG. 31 |
| 5,894,997 A | * | 4/1999 | Chen | B29B 17/04 241/34 |
| 6,015,105 A | * | 1/2000 | Brewer | B29B 17/02 241/DIG. 31 |
| 7,757,978 B2 | * | 7/2010 | Pagaza-Melero | B29B 17/0412 241/DIG. 31 |
| 7,857,249 B2 | * | 12/2010 | Nanney | B26F 1/40 241/DIG. 31 |
| 9,156,192 B2 | * | 10/2015 | Butler | B02C 19/06 |
| 2002/0096583 A1 | * | 7/2002 | Garner | B02C 19/20 241/24.17 |
| 2002/0117564 A1 | * | 8/2002 | Hahn | B02C 13/18 241/1 |
| 2011/0163190 A1 | * | 7/2011 | Verri | B26D 7/02 241/15 |
| 2011/0168818 A1 | * | 7/2011 | Verri | B29B 17/02 241/101.2 |
| 2015/0197038 A1 | * | 7/2015 | Jones | B29B 17/0206 241/38 |
| 2017/0080604 A1 | * | 3/2017 | Moldovan | B02C 19/065 |
| 2018/0085971 A1 | * | 3/2018 | Chan | B02C 19/061 |
| 2019/0076939 A1 | * | 3/2019 | Salvadori | B23D 33/02 |
| 2021/0129240 A1 | * | 5/2021 | Salvadori | B02C 18/02 |

FOREIGN PATENT DOCUMENTS

| | | |
|---|---|---|
| EP | 2420371 | 2/2012 |
| FR | 2773727 | 7/1999 |
| WO | 2009/068874 | 6/2009 |
| WO | 2009/129906 | 10/2009 |

* cited by examiner

TIRE DISRUPTOR DEVICE

Purpose of the invention which is the subject of this application is to describe a device for the treatment of waste, especially tires, and the consequent recovery of materials that constitute them.

The main objective is the real recovery, avoiding to generate, except in small part, other waste to be disposed of or treated in turn.

The process that uses this device involves splitting in advance the tire into three parts, i.e. separate the tread from the two sides to deal separately with two different types of equipment.

In particular, the purpose of the invention which is the subject of this application is to create a unit for the disintegration of treads of tires previously separated by the two sides or for the disintegration of sidewalls of tires previously separated by the corresponding tread, using Water-Jet technology.

The "end of life tires" (ELTS) represent a very large environmental problem, mainly due to the stability of the components that determines a "natural degradation time" of more than 100 years.

Recycling technologies until now in use are essentially mechanical and have a few limitations:
- the quality and characteristics of the reclaimed rubber in the form of granulates and powder, reusable only as aggregate, and
- the maximum size of the tires that can be processed with mechanical systems, which makes it impossible to dispose of entire categories of tires, still placed in large landfills in mining areas or large construction sites. To overcome the above mentioned limits it is possible to use the Water Jet cutting technology, well known throughout the industry as Water-Jet technology.

Using Water-Jet technology, with 2,000 to 3,000 bar water pressure, you can overcome the above mentioned limits by obtaining more advanced results, listed below:
- The recovered rubber in granulate and powder form, is in big percentage de-vulcanized and then reusable in replacement of natural or synthetic rubber and not only as filler.
- There is no maximum size of tires that can be processed with Water-Jet system, and it will make it possible to process all large ELT recovering the components.

At the state-of-the-art are known several research projects and patent applications relating to the application of Water-Jet technology disposal of ELT however industrial applications have not yet yielded positive results.

Following are briefly examined the solutions under patent application object known at the state-of-the-art:

The WO2010023700 patent application concerns a solution that provide to stack some tires in a cage and treat them with Water jets, following the internal and external profile through a 6-axis Cartesian system.

The WO2010023548 patent application describes a complete plant for the recycling of tires based on an equipment for disintegration essentially similar to that described by the cited previous document.

In both cases the solutions highlight some drawbacks that are summarized below:
- need for an adaptive guidance system that keeps nozzle devices at the shortest distance from the surfaces to be treated,
- impossibility to achieve, and demolish, the juxtaposed faces of the tire sidewall because shielded from the inside steel-framework,
- reduced of effectiveness/efficiency of external nozzles, acting on the tire tread, due to the presence of containment cage that determines the partial shielding of the high pressure water-jet nozzles themselves,
- the distance of the nozzle-holder devices from the surfaces to be treated, resulting in reduction in efficiency (approximately quadratic in relation to the distance). Furthermore, as per what described by WO2010023548, in addition to the described disadvantages it needs a tire pressing process aimed at approaching the sidewalls.

The patent application WO9605039 uses high pressure water jets inclined with respect to the surface to be treated and positioned so as to overlap partly the action path of each jet during the relative motion of the tread toward the Jets themselves.

The solution described in the document cited has the following disadvantages:
- the use of single nozzles compared to rotating nozzle heads, as we do, represents a simplified plant design but gets an efficiency of at least 30% less,
- the inclination relative to the perpendicular would reach, in the case of rotating nozzle heads, slightly lower efficiency, but never higher.

The document WO2009068874 describes a complete process of recovery of materials from tires, using at least 7 processing steps. The solution described by this document has the following disadvantages:
- the processing of treads, separated from the rest of the tire is realized in "strip", i.e. after cutting the ring to convert the entire tread in a flat strip, in order to operate successfully in the disintegration of this you must hold the workpiece while the high pressure jets carry out their action, this requires at least to leave a rubber band not disintegrated in head and tail to the same, namely the securing or drag points the workpiece generate inaccessible or "shielded", and therefore not treated, parts of the piece self;
- the treatment takes place by passing the Strip through the equipment of disintegration at a certain speed while the nozzles demolish the gum that passes beneath them: the passing speed determines, with other factors constant, the thickness of the layer of rubber removed. Given that, especially since we tell of used tires, the rubber thickness you encounter is highly variable from one tire to another (it may be 1 to 3 times), it becomes mandatory to measure the thickness of each tread and adjust the speed of passage each time, or work with several passes back and forth.

The document U.S. Pat. No. 5,115,983 describes a complete process of recovery of materials from tires, that too based on division of the tire into several pieces.

Also the patent application WO2011158002 describes a tire tread treatment process: it is treated in the "strip", i.e. after cutting the ring and have converted the entire tread in a flat Strip behaving the same disadvantages described The DE19818566 patent application describes a treatment process of tire tread, leaving only integer the same tire, and using the only recovered rubber from the tread. The remainder may be further processed. In other words, by a waste material (ELT) you recover a part and you produce another waste: this is the big disadvantage of this system. Also the patent application WO2008084267 describes a process of treating only tire tread, leaving whole the same tire, and using the only recovered rubber from the tread. The workaround involves the disadvantages listed above.

Purpose of the invention which is the subject of this application is to overcome the disadvantages of the state of the art, in particular realizing a device and a work procedure that reduces costs and simplifies timing and manufacturing processes.

In particular the purpose of the invention which is the subject of this application is to create a device and a process that requires the entire tread or the entire sidewall continue to feed until the measuring system detects reduction/removal of thick, i.e. detecting a variation rather than an absolute measurement.

A further aim of the invention which is the subject of this application is to create a device that can completely remove the rubber from the steel-frame of the tire's tread with high pressure water jets so that the rubber so removed is present in the form of powder and granules.

In the event that inside the tire there are one or more layers of fabric, they are also removed along with the rubber in the form of flakes.

The steel-frame, once completed the tire removal cycle, remains on a roller conveyor to be automatically downloaded from the device. The rubber and the eventual tissue fall into the hopper with the process water and then are separated to be sent to other equipment of the plant, downstream of the device covered by this patent application, for further purification treatments and classification.

The device covered by this patent application is depicted in the attached figures where:

Figure 8:
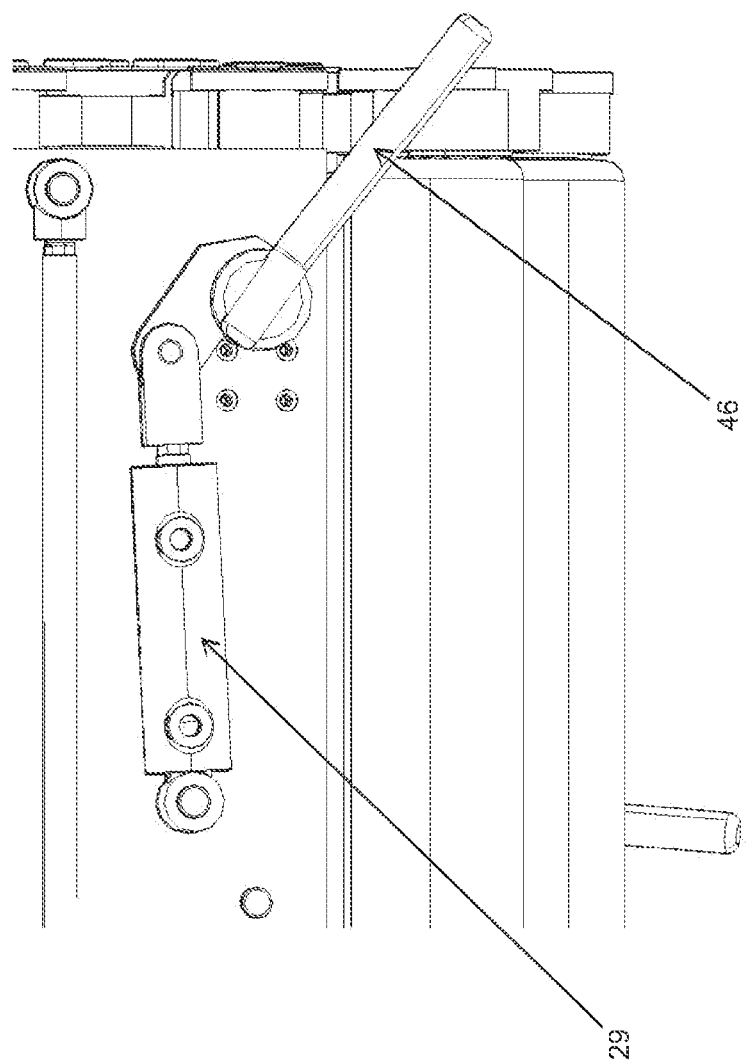

FIG. 8 Detail of a first preferred embodiment of the left front guide in open position.

Figure 9:
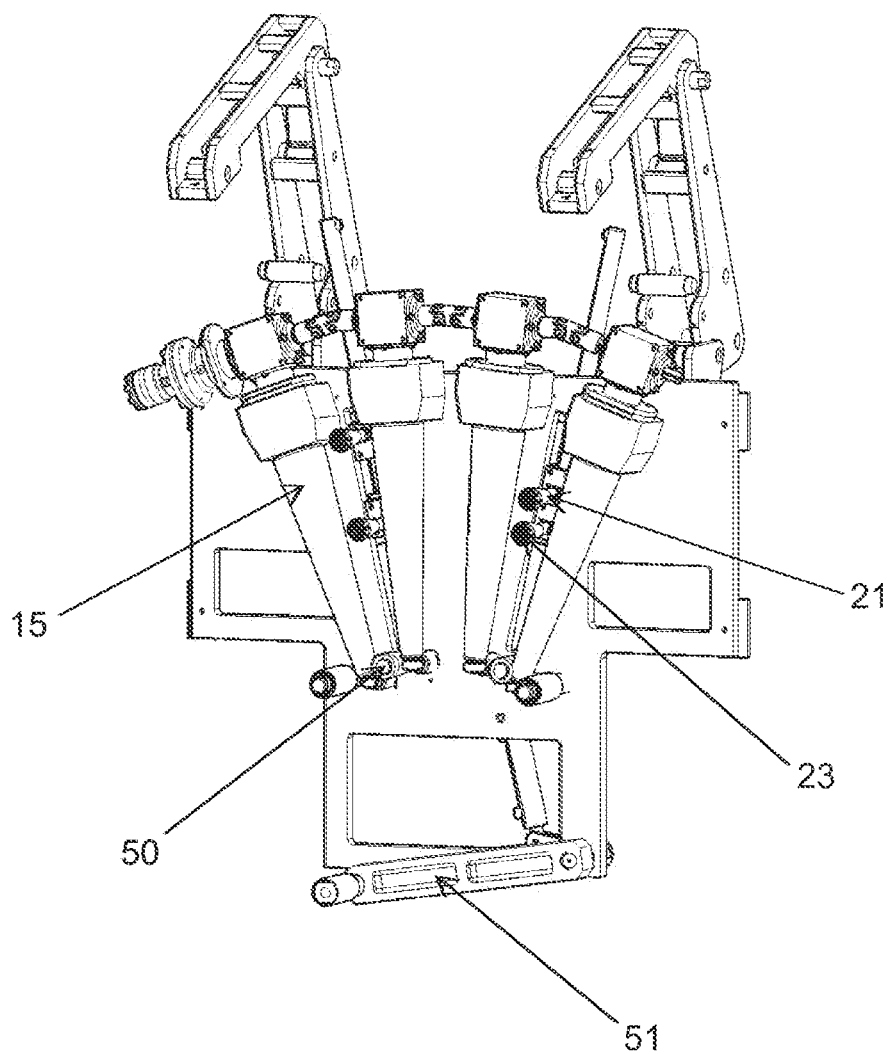

FIG. 9,10 Shows a detail of a second preferred embodiment of the lower assembly.

Figure 11:
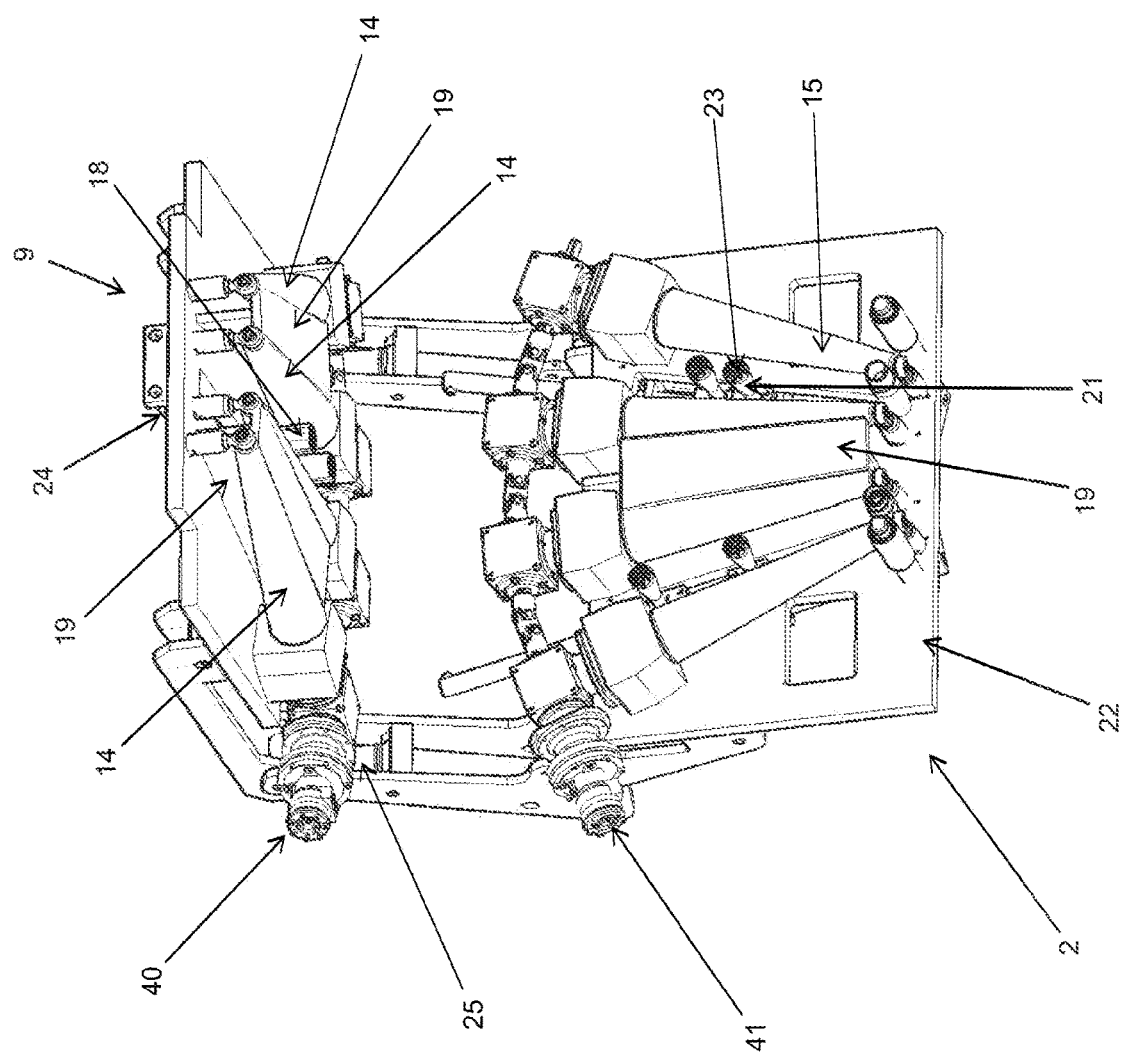

FIG. 11,12 Shows a detail of a second preferred embodiment of the upper assembly.

With reference to the attached figures, the device covered by this patent application consists of:

lower assembly (2) of driving rollers, upper assembly (9) of driving rollers, and its suspension system constituted by a lift arms system (1a, 1b);

a set of auxiliary elements in turn consisting of a hydraulic system for the delivery of the ultra-high pressure water (FIG. 10) provided by an external group of pumps (10.1), a frame built by square tubular covered with soundproofing panels and provided with a loading door with automatic opening not shown in the figures, a hopper (8) for collection of fragmented materials, a vibrating-screen assembly (4) for the collection and separation of granules from water, an hydraulic power pack (6), an electrical panel with PLC controller (5), and a group for forced ventilation system and of air/water separation (10).

Figure 1:
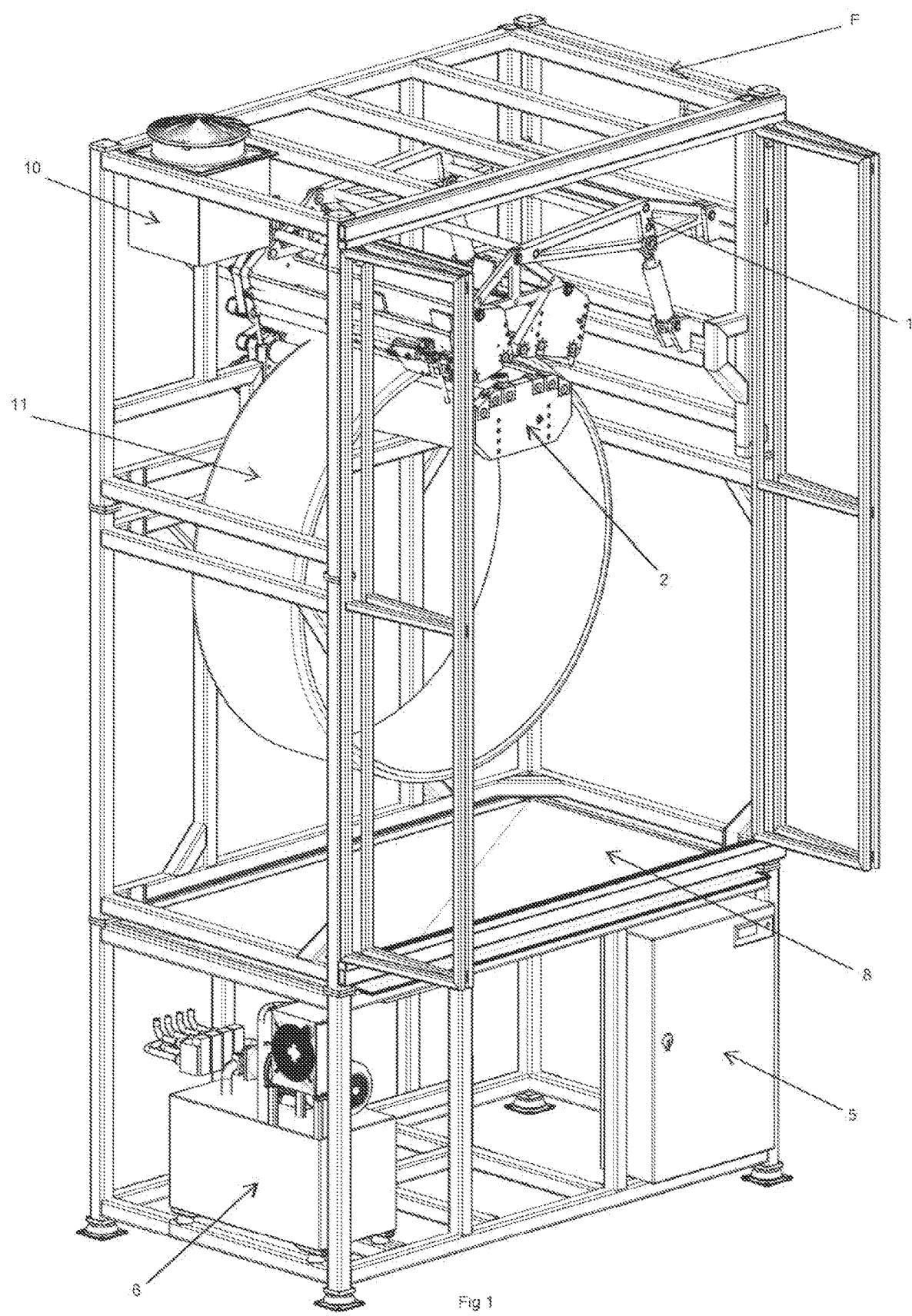
FIG. 1 shows the general view of the configuration of the device for the disintegration of treads of tires.
Figure 2:
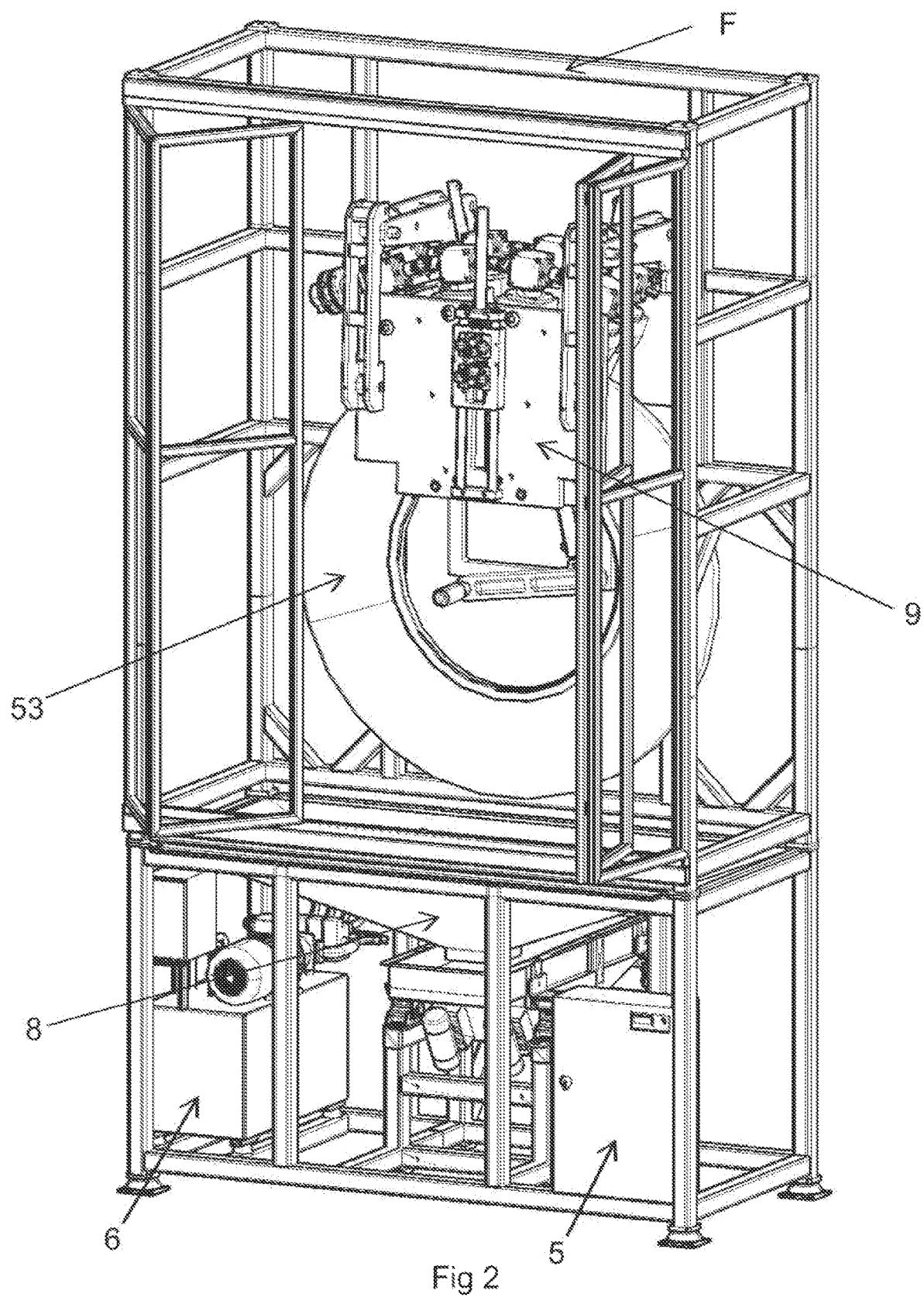
FIG. 2 shows the general view of the configuration of the device for the disintegration of sidewalls of tires.
Figure 3:
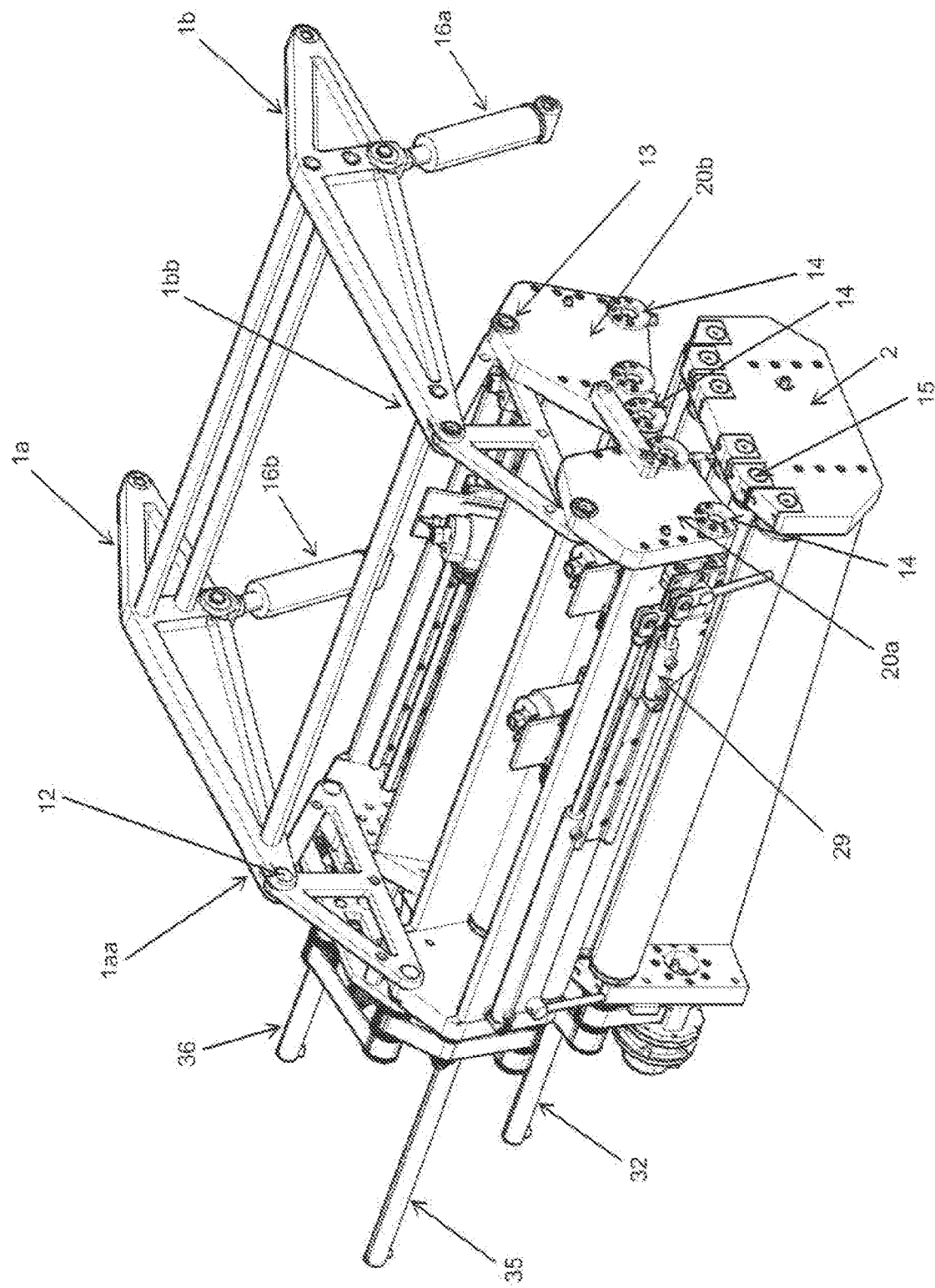
FIG. 3 shows the upper and lower assemblies of driving rollers displaying the tread in his location.
Figure 4:
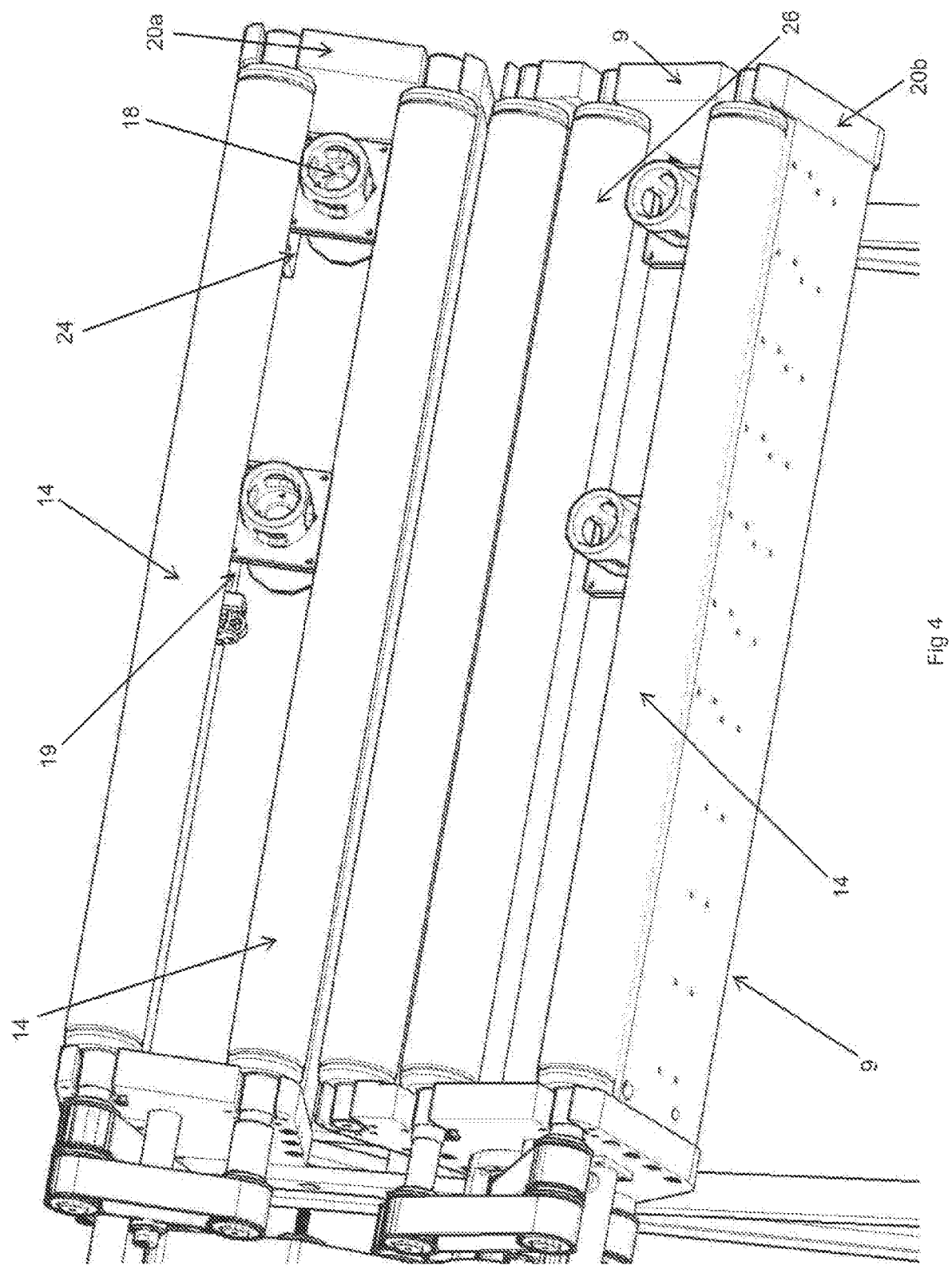
FIG. 4 shows a detail of a first preferred embodiment of the upper assembly.
Figure 5:
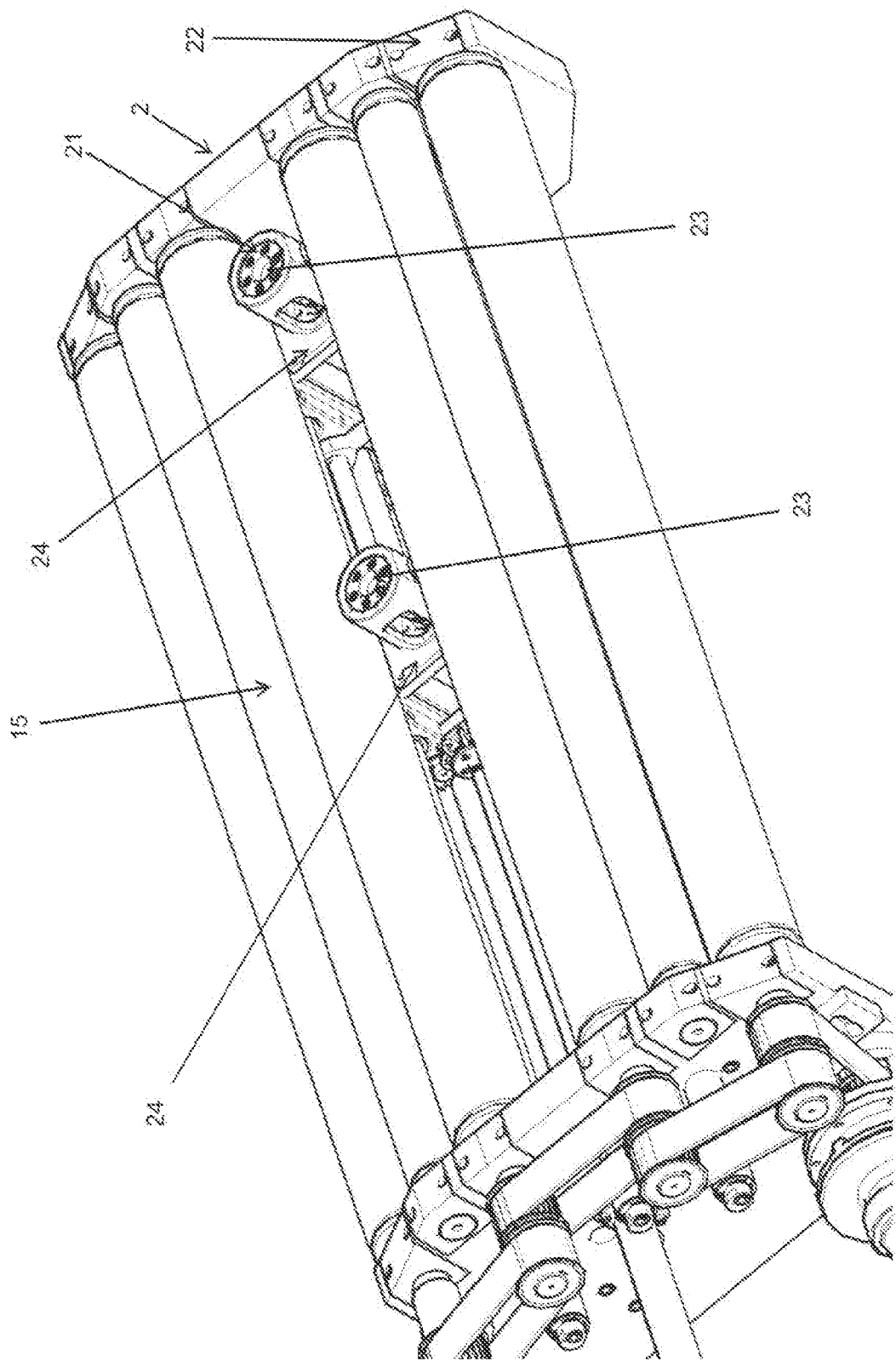
FIG. 5 Shows a detail of a first preferred embodiment of the lower assembly.
Figure 6:
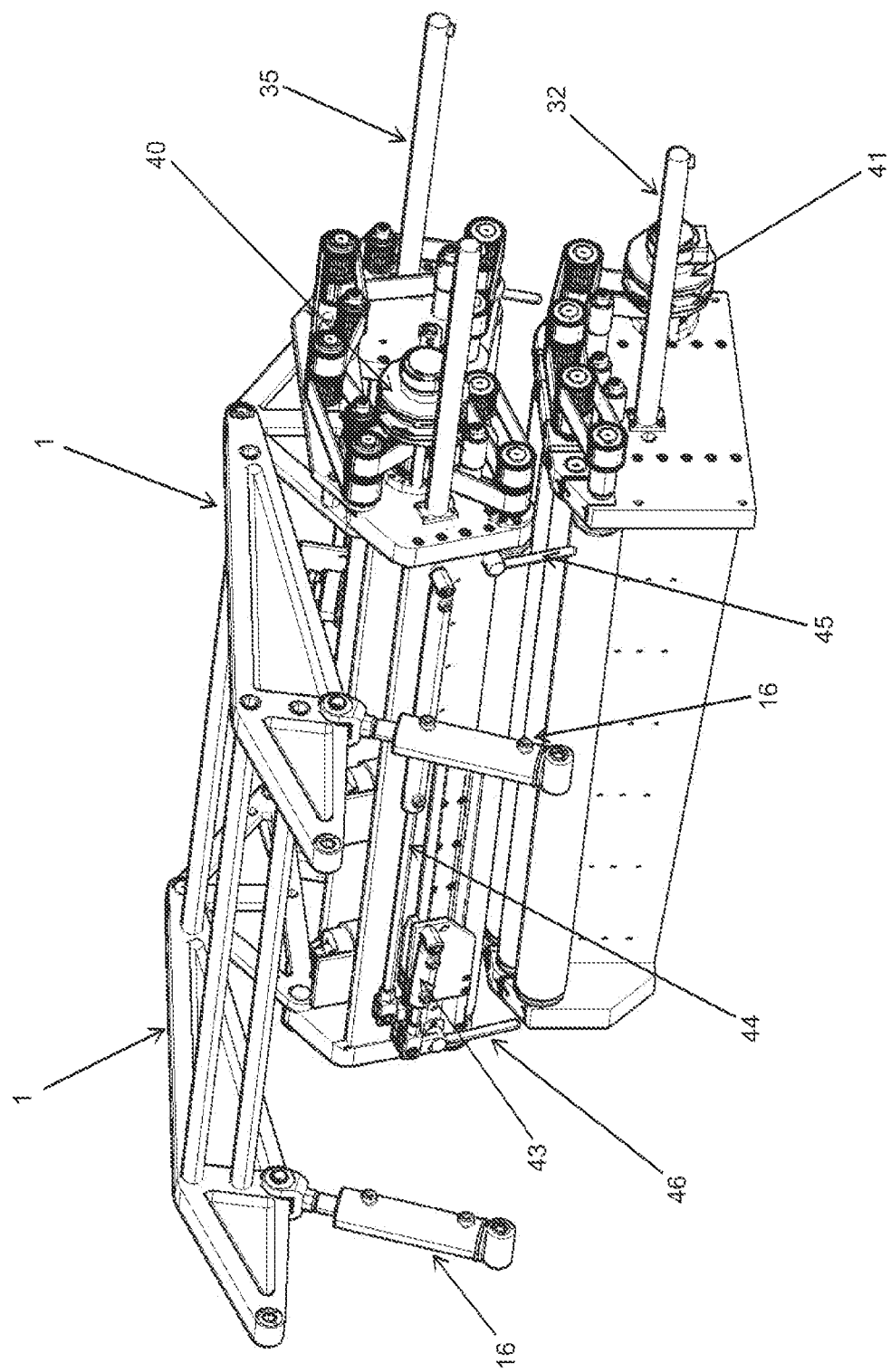
FIG. 6 Shows the detail a first preferred embodiment of the front of upper and lower system.

In a preferred embodiment (FIG. 1) the device for the disintegration of treads of tires (11) presents a lower assembly (2) and an upper assembly (9) as follows:

with reference at FIG. 5, the lower assembly (2) presents a set of rollers (15) mounted on a fixed frame (22); in the space between two of these rollers (15) scrolls a slide (24) for nozzle-head (21) that supports one or more, left and right, lower nozzles (23).

The nozzles (23) of the lower head (21) are powered by high pressure water and represent the Water-Jet tools that perform the work of disintegration.

The upper assembly (9) of driving rollers (14) of the device described consists on a frame (20) divided into two identical first half-frame (20a) and second half-frame (20b) supported by two arms (1a, 1b).

A side of each arm (1a, 1b) is connected to the frame (20) and the other side of each arm (1a, 1b) is connected to the chassis of the device through a couple of lifting cylinder (16a, 16b).

The first half-frame (20a) is hinged to the second half-frame (20b) and the first and the second half-frames (20a, 20b) are suspended by an axis of rotation (13), by means of a couple of triangular frames connected to the axis of rotation (12) on the terminal of the arms (1a, 1b).

The upper assembly (9) presents a series of rollers (14) and a movable plate (19) positioned on each half-frame (20a, 20b) between two of these rollers and supporting an upper nozzles head (18).

The nozzles of the upper head (18) are powered by high pressure water and represent the Water-Jet tools that perform the work of disintegration.

The small oscillations that two half-frames (20a, 20b) can carry around these axes (12.13) are used to maintain in constant mesh the upper driving rollers (14), adapting their geometry to the variation of the thickness (and thus the difference between the inner and outer diameters) of a tread (11).

This geometric condition, which sees all the driving rollers constantly in mesh, is the basic requirement to ensure uniform feed and without lateral slipping of the tread. With this configuration you get the safe clamping of workpiece (11) between the two sets of rollers that simultaneously feed the same piece, while the rotating nozzles move transversely with reciprocating motion.

The reciprocating motion of the upper and lower heads (18 and 21), combined with the feed of the tread (11) determined by the rotation of the rollers (14), makes it possible to scan the entire surface of the tread (11). The device covered by this patent application made as described, by virtue of the adaptability of the rollers (14,15) to the forms that are treating and implemented as described, results in a geometry that allows to keep constant the gap of the nozzles from the surface to be machined; this configuration is achieved by mounting the upper and lower nozzles-heads (18 and 21) between two rollers, positioned slightly behind (2-5 mm) than the tangent line of the two rollers, and ensuring that the two rollers are always in contact with the surface to treat and always in contrast with their respective position rollers of the opposite assembly. Also the configuration of the rollers with that of the nozzles-heads (18 and 21) is so that the whole surface to be treated is covered, leaving no parts that cannot be reached, eliminating the disadvantages of the state of the art that still necessitate fastening or drag points in the workpiece, with the consequence of making unachievable or "shielded" parts of it, and then to get untreated parts.

Additional benefit resulting from the construction of the device as described is the automatic adjustment to the width of the piece, obtained through the side-guides (45, 46); it ensures that the working stroke of the respective nozzles-heads (18 and 23) is limited to the band-width to disrupt, considering that width is variable from one tread to the next.

The function of the side guides for the tread (11) is essentially to keep the tread (11) in the correct position during the disgregation, preventing that the feed-drive causes lateral slippage.

Figure 7:
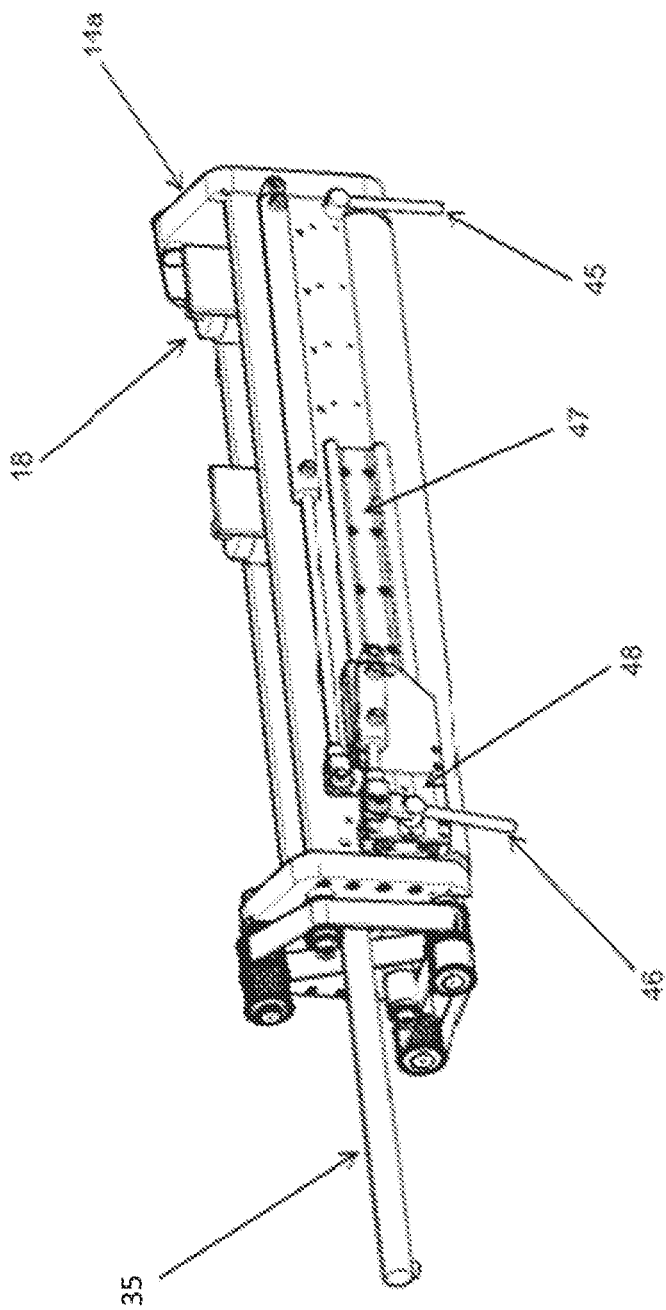
FIG. 7 Shows the detail of a first preferred embodiment of the side guides.

The rear guides (45) are mounted in a fixed position and, when they clashed from the edge of the tread (11) during the loading phase, actuate a alignment limit-switch device. The front guides (46) are mounted on a mobile plate (48) that can slide on guide rails (47) and can rotate about 60°, staying respectively in the open position (FIG. 8) and in the closed position (FIG. 7).

Under the mobile plate (48) is fitted a proximity switch which limits the working stroke of the sleds carrying the nozzles-heads (18, 23).

During the loading phase of the tread (11) on the disruptor device described, the front tread alignment guides (46) rotate upwards (FIG. 8), the feed cylinder (44) pushes the sled (48) forward to maximum stroke; now is loaded the tread (11) and placed on the lower assembly of driving rollers (2). The rotation cylinder of the front guides (29) rotates the front guide (46) down and the feed cylinder (44) move the slide of the edge guide (48) inwards until the tread (11) meets the rear guide (45) and its proximity switch: now the tread is in "working position".

These side guides (45 and 46), in addition to the mechanical function of passive guide, have the other two functions:
tread alignment after the loading operation, bringing the inside edge of the tread always in the same position,
limitation of the working stroke of the sleds carrying the nozzles-heads.

Additional advantages of the device created as described is the auto-fit to the thickness of the piece: as described above the nozzle holder heads geometry (18 and 21) is obtained by inserting them between two rollers, positioned slightly behind (2-5 mm) than the tangent line the two rollers, allowing the two rollers to be always in contact with the surface to disgregate and always in contrast with the corresponding roller of the opposite rollers-assembly. This measure alone is not enough to get the complete result, in fact we must also take into account that treads that are processed can have different diameters and thickness.

To take account of this factor, the geometry of the assembly of lower driving rollers (2) and upper driving rollers (9) follows two different criteria: the rollers of the lower assembly (2) are mounted in a fixed position along a circular shaped generatrix; the rollers of the upper assembly (9) are mounted on adjustable equipment, suspended by a rotation axis (13) that give them the ability to rotate to fit the underlying surface; the adjustable equipment themselves are suspended at a rotation axis (12) at the ends of the arms (1), supported by the lifting cylinders (16*a*, 16*b*).

Squeezing the upper roller assembly (9), using the lift cylinders (16), on the tread laying on the assembly of lower driving rollers (2) keep the rollers always in contact with the respective surfaces to treat and then the nozzles-heads always riser at the same distance from the surfaces themselves.

The device described is an automatic device, expected to run a route repetitively and to stop in case of malfunctions.

The route implemented through the device created as described consists of the following phases:

initial condition
first cycle repeated until the stop command or anomaly.

Description of the Phase "Initial Condition"

The initial condition provides that the rollers (14) and the nozzles-heads (18 and 21) are stationary, the water pressure to a minimum, the front tread alignment guides (45) are rotated upward (FIG. 8 *b*) and moved to "external" position, the upper roller assembly (9) lifted and the tread (11) to disgregate laying on the rollers (15). Description of the phase "starting first cycle":

The startup of the first cycle begins with the lowering of the upper rollers (9) to the intermediate position, the spin down of the front-guides and the following shifting inwards until the tread meets the rear guides (45) and the relative limit switch: at this point the tread is in "working position".

Subsequently the upper rollers assembly (9) is lowered further by pressing on the rubber and the rollers (14,15) rotate to drag the tread (11).

Afterwards the nozzles-heads (18 and 21) spin on themselves and slide on their guides with alternative movement.

The water pressure rises the maximum value and the Jets issued from the nozzles-heads (18 and 21) erode the rubber until leaving exposed the steel belts.

The cycle continues until a thickness sensor finds the set value of "minimum level change" and gives the signal of "end of cycle" and the new tread is brought to the standby position from the loading system.

The device as described will stop at the end of the previous cycle in "loading/unloading waits" position: water pressure to a minimum, rollers stationary, nozzles-heads stationary. Throughout the cycle the rubber disintegrated and the process water fall into the hopper (8), from the hopper are conveyed in the vibrating screen (4), the vibrating screen (4) separates the oversized pieces from the rest of the rubber, rubber water-mixture is then separated and recovered.

Figure 10:
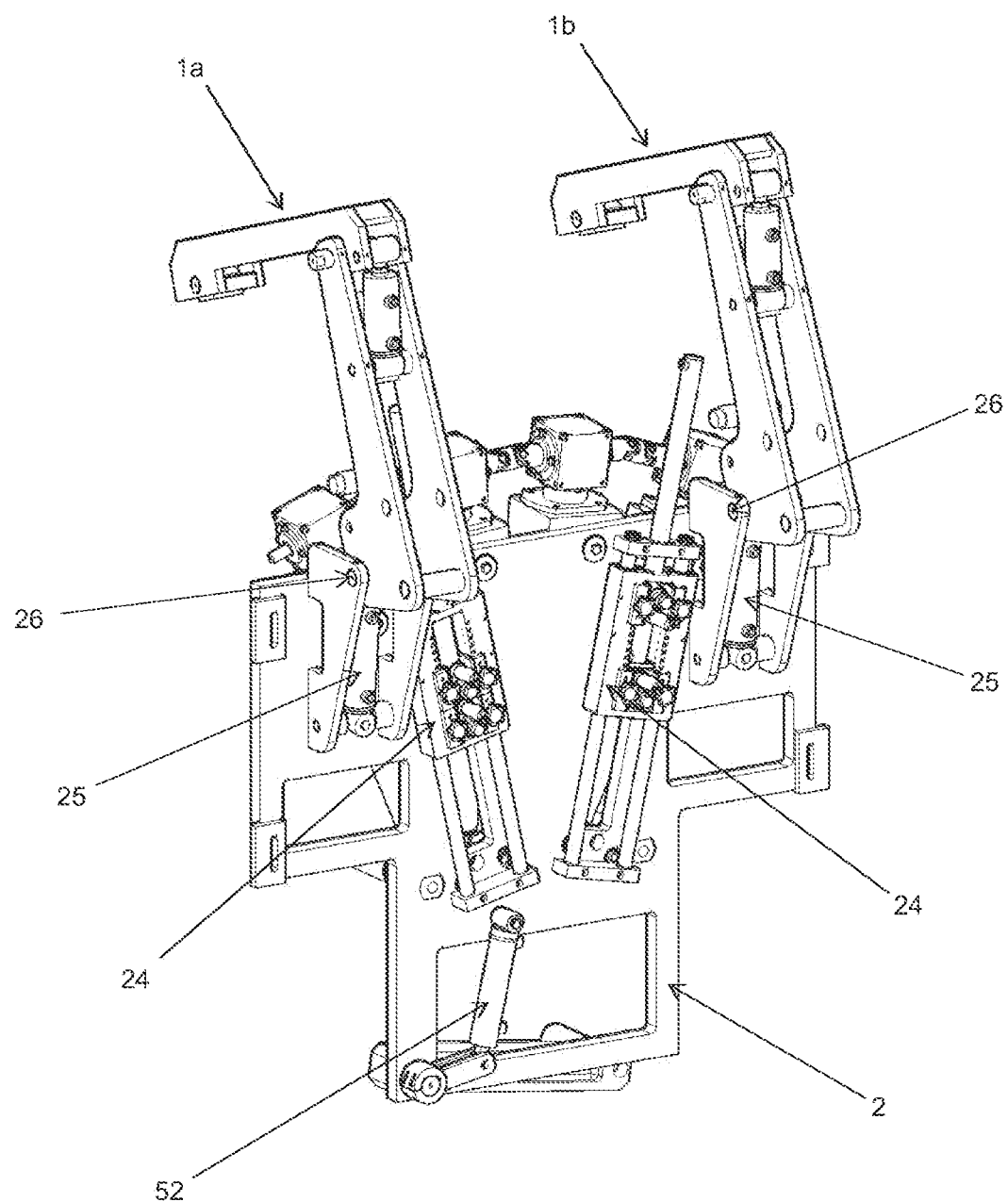

In another preferred embodiment (FIG. 2,9,10,11,12), the device for the disintegration of sidewalls of tires, previously separated by the corresponding treads (11), presents a lower assembly (2) and an upper assembly (9) as follows: with reference at FIGS. 9,10,11 the lower assembly (2) presents a set of rollers (15), in particular tapered rollers, mounted on a fixed frame (22); in the space between two of these tapered rollers (15) scrolls a slide (24) for nozzle-head (21) that supports one or more, left and right, lower nozzles (23).

The lower nozzles (23) of the lower head (21) are powered by high pressure water and represent the Water-Jet tools that perform the work of disintegration.

Figure 12:
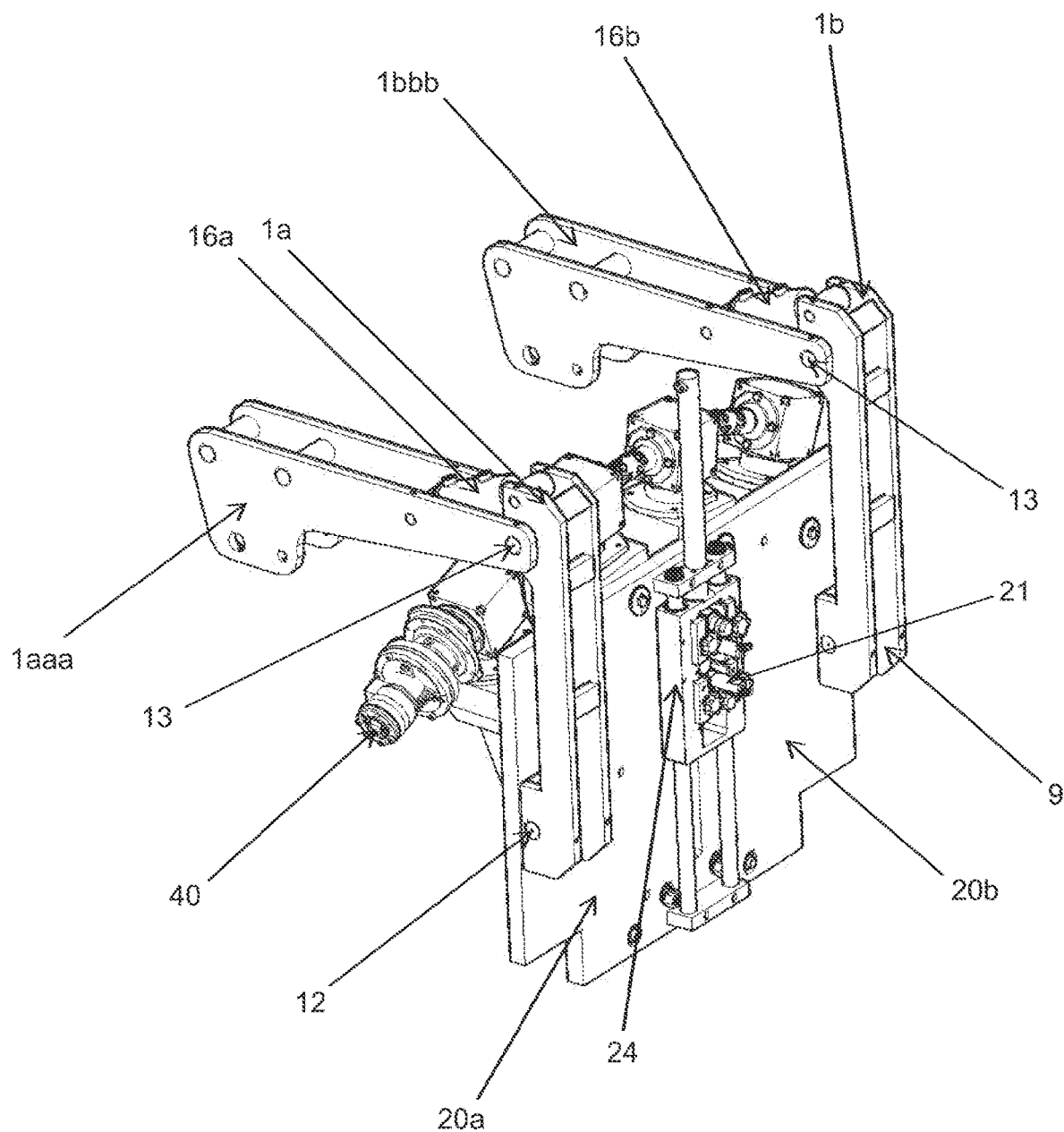

With reference at FIGS. 11 and 12, the upper assembly (9) presents a set of driving rollers (14), in particular tapered rollers, mounted on a mobile frame (20) composed by a two identical half-frame (20*a*, 20*b*) each of half-frame (20*a*, 20*b*) supported by two arms (1*a*, 1*b*).

A side of each arm (1*a*, 1*b*) is connected to the half-frame (20*a*, 20*b*) and the other side of each arm (1*a*, 1*b*) is connected to the chassis of the device through a couple of lifting cylinder (16*a*, 16*b*).

Each arm (1*a*, 1*b*) is composed by a first arm (1*aa*, 1*bb*) connected to a second arm (1*aaa*,1*bbb*) by a generic mechanical means that act as rotation axis (13).

The first half-frame (20*a*) is hinged to the second half-frame (20*b*) and the first and the second half-frames (20*a*, 20*b*) are suspended by a rotation axis (13).

The upper assembly (9) presents a series of rollers (14) and a movable plate (19) positioned on each half-frame (20*a*, 20*b*) between two of these rollers and supporting an upper nozzles head (18).

The nozzles of the upper head (18) are powered by high pressure water and represent the Water-Jet tools that perform the work of disintegration.

More specifically, the upper assembly (9) is supported by a frame (20) composed by a two identical half-frame (20a, 20b) each of half-frame (20a, 20b) hinged on at least one spindle that act as rotation axis (12) and each of half-frame (20a, 20b) is suspended to a first lift arms (1a, 1b).

The whole assembly is then moved and held in place around the rotation axes (13)—through the lift cylinders (16a, 16b).

The small oscillations that two half-frames (20a, 20b) can carry around their axes of rotation (12,13) are used to maintain in constant mesh the upper driving tapered rollers (14) adapting their geometry to the variation of thickness of the sidewall (53) of the tread.

This geometric condition, which sees all the driving rollers constantly in mesh, is the basic requirement to ensure uniform feed and without lateral slipping of the sidewall (53) in process.

To ensure precise positioning of the sidewall (53), on the lower frame (22) are mounted at least two supporting rollers (50) on which supports and rotate the crown formed from the sidewall (53).

As completion of the accurate positioning of sidewall (53) in the machining device comes the centering roller (51) of sidewall (53) that is pushed in place through the lifting cylinder of centering roller (52), mounted on the lower frame (22).

With this configuration you get the safe clamping of sidewall (53) between the two sets of tapered rollers (14,15) that simultaneously feed the same piece, while the rotating nozzles move transversely with reciprocating motion.

The reciprocating motion of the upper assembly (9) and lower assembly (2), combined with the feed of the sidewall (53) determined by the rotation of the driving tapered rollers (14,15), makes it possible to scan the entire surface of the sidewall (53).

The device described, by virtue of the adaptability of the rollers (14,15) to the forms that are treating and implemented as described, results in a geometry that allows to keep constant the distance of the nozzles from the surface to be machined; this configuration is achieved by mounting the upper and lower nozzles-heads (18 and 21) between two rollers, positioned slightly behind (2-5 mm) than the tangent line of the two rollers, and ensuring that the two rollers are always in contact with the surface to treat and always in contrast with their respective position rollers of the opposite assembly.

Also the configuration of the rollers with that of the nozzles-heads is so that the whole surface to be treated is covered, leaving no parts that cannot be reached, eliminating the disadvantages of the state of the art that still necessitate fastening or drag points in the workpiece, with the consequence of making unachievable or "shielded" parts of it, and then to get untreated parts.

Description of the Phase "Initial Condition"

The initial condition provides that the rollers (14,15) and the nozzles-heads (18,21) are stationary, the water pressure is to a minimum, the centering roller (51) are in the "up" position, the mobile tapered roller assembly (9) lifted and the sidewall (53)—to be disgregate resting—on the supporting rollers (50).

Description of the Phase "Starting First Cycle"

The startup of the first cycle provides for the lowering of the mobile tapered roller assembly (9) up to the job position, the rotation down flank centering roller (51): at this point the sidewall is in "working position". Subsequently the upper mobile tapered roller assembly (9) presses the sidewall (53) on the fixed tapered roller assembly (2) and all the rollers (14,15) start rotating to drag the sidewall (53).

Afterwards the nozzles-heads (18 and 21) spins on themselves and slide on their guides (19,24) with alternative movement. The water pressure rises the maximum value and the Jets issued from the nozzles (23) erode the rubber until leaving exposed the internal steel armature.

The cycle continues until the thickness sensor finds the set value of "minimum level change" and gives the signal of "end of cycle" and the new sidewall is brought to the standby position from the loading system.

The device as described will stop at the end of the previous cycle in "loading/unloading waits" position: water pressure to a minimum, rollers stationary, nozzles-heads stationary.

Throughout the cycle the rubber disintegrated and the process water fall into the hopper (8), from the hopper (8) are conveyed in the vibrating screen (4), the vibrating screen (4) separates the oversized pieces from the rest of the rubber, rubber water-mixture is then separated and recovered.

The invention claimed is:

1. A disruptor device comprising:
   a frame, said frame having a water jet system to disaggregate one portion of a tread or a sidewall of a tire;
   a hydraulic power unit;
   a control cabinet with a PLC and a control panel;
   a lower assembly;
   an upper assembly;
   a hopper for collection of fragmented materials and a vibrating screen;
   a group for a forced ventilation system and an air/water separation, wherein:
   the upper assembly includes a series of rollers and an assembly frame having a first half-frame and a second half-frame, wherein the first half-frame and the second half-frame are identical;
   the upper assembly is supported by the frame by two arms;
   each of the first half-frame and the second half frame including a movable plate, the movable plate positioned between two rollers of the series of rollers and supporting an upper nozzles head supplied with high pressure water through a piping system;
   the lower assembly includes a set of rollers mounted on a fixed frame; and
   a slide for a nozzle head, the slide positioned in a space between two rollers included in the set of rollers, wherein the slide supports one or more, left and right, and lower nozzles supplied with the high pressure water through the piping system.

2. The device according to claim 1, wherein a side of each arm of the two arm is connected to the corresponding first half-frame or second half-frame and an other side of each arm of the two arms is connected to the frame through a lifting cylinder.

3. The device according to claim 1, wherein each arm of the two arms includes a first arm connected to a second arm.

4. The device according to claim 1, wherein the first half-frame is hinged to the second half-frame.

5. The device according to claim 1, wherein the upper assembly includes two fixed rear guides with an aligning limit switch device.

6. The device according to claim 1, wherein the upper assembly includes two movable front guides.

7. The device according to claim 1, wherein the upper assembly includes two guide rails and a movable slide.

8. The device according to claim 1, wherein the series of rollers includes a first set of upper driving rollers and a second set of upper driving rollers, wherein at least a slide is inserted between the first and second sets of upper driving rollers included in the series of rollers.

9. The device according to claim 1, wherein the upper assembly includes a first feed cylinder positioned on the first half-frame and connected to the slide of the first-half-frame and a second feed cylinder positioned on the second half-frame and connected to the slide of the second half-frame.

10. The device according to claim 1, wherein the upper assembly is equipped with a proximity switch to operate a reversing of a stroke of the upper nozzles head of the first half-frame and the upper nozzles head of the second half frames.

11. The device according to claim 1, wherein the upper assembly is equipped with gear motor.

12. The device according to claim 1, wherein the lower assembly includes sets of rollers, wherein a slide is positioned between the sets of lower driving rollers.

13. The device according to claim 1, wherein the lower assembly includes a feed cylinder for the nozzle head.

14. The device according to claim 1, wherein the lower assembly is equipped with gear motor.

15. The device according to claim 1, wherein the lower assembly is equipped with a thickness sensor.

16. The device according to claim 1, wherein the rollers in the sets of rollers are tapered and the rollers in the series of rollers are tapered.

17. The device according to claim 1 wherein the frame includes at least two supporting rollers.

18. The device according to claim 1, wherein the frame includes a centering roller.

* * * * *